March 3, 1964 K. H. HOWARD 3,123,115
APPARATUS FOR HULLING NUTS
Filed Sept. 24, 1959 3 Sheets-Sheet 1
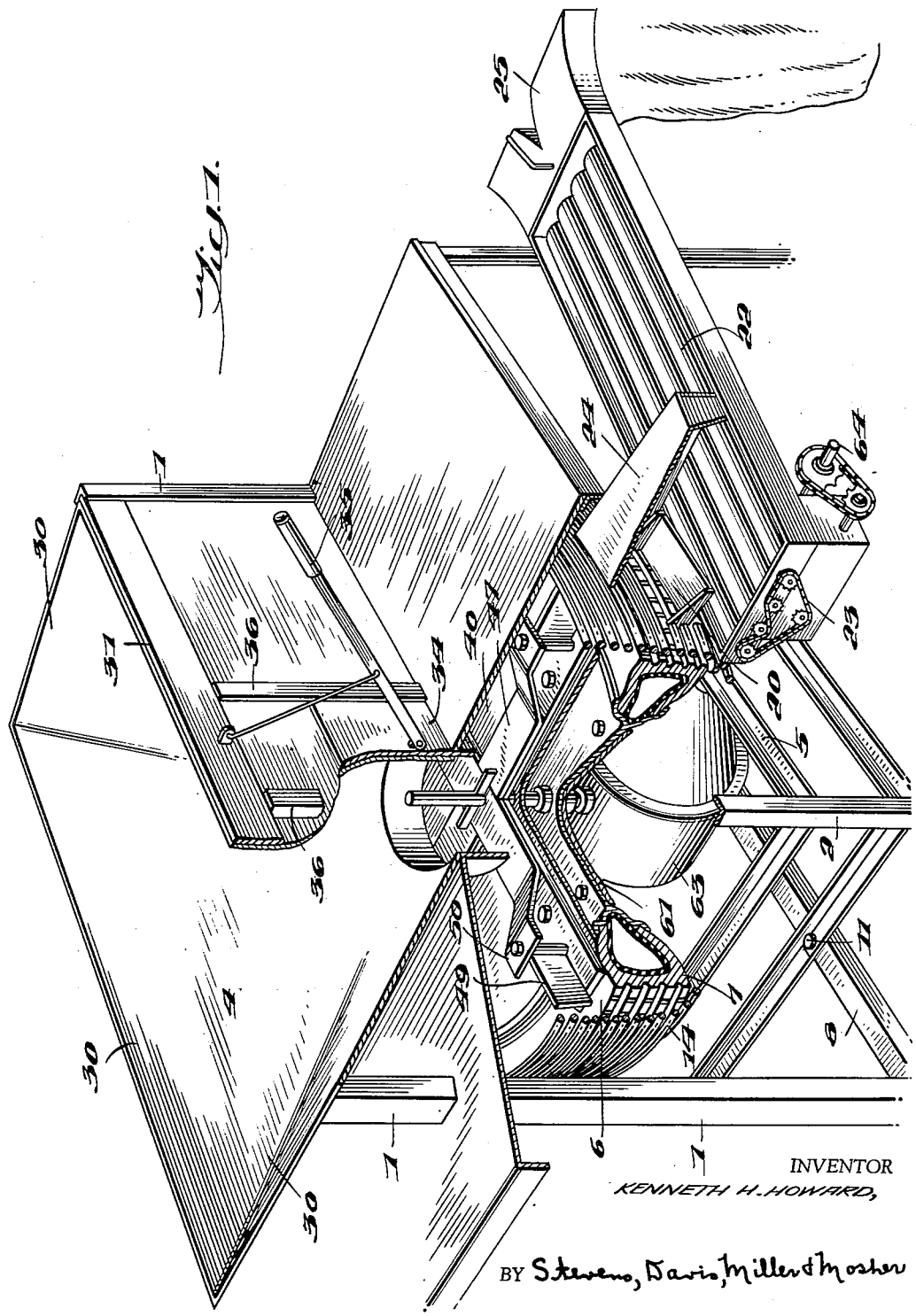
INVENTOR
KENNETH H. HOWARD,
BY Stevens, Davis, Miller & Mosher
ATTORNEYS March 3, 1964  K. H. HOWARD  3,123,115
APPARATUS FOR HULLING NUTS
Filed Sept. 24, 1959  3 Sheets-Sheet 2
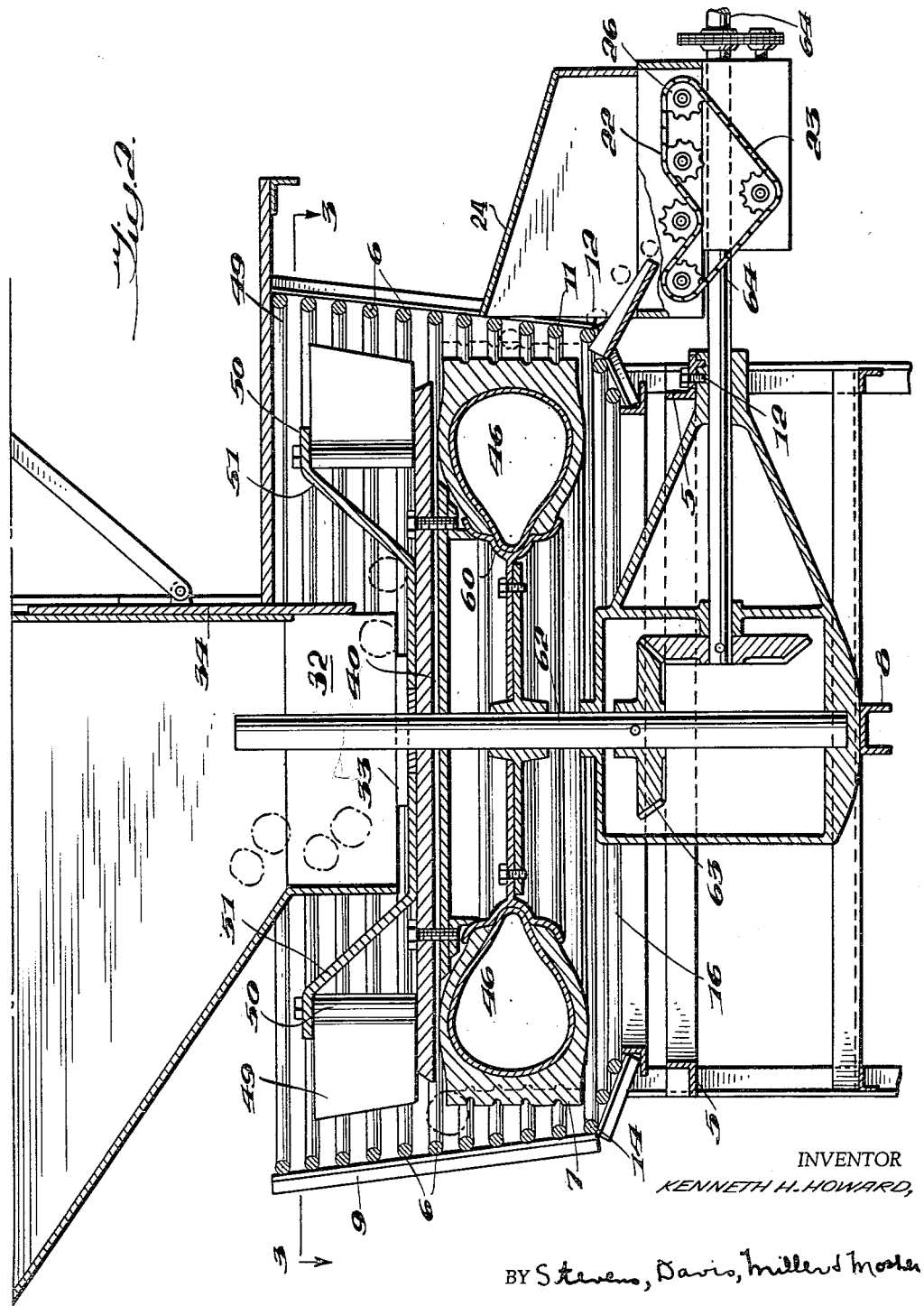
INVENTOR
KENNETH H. HOWARD,
BY Stevens, Davis, Miller & Mosher
ATTORNEYS

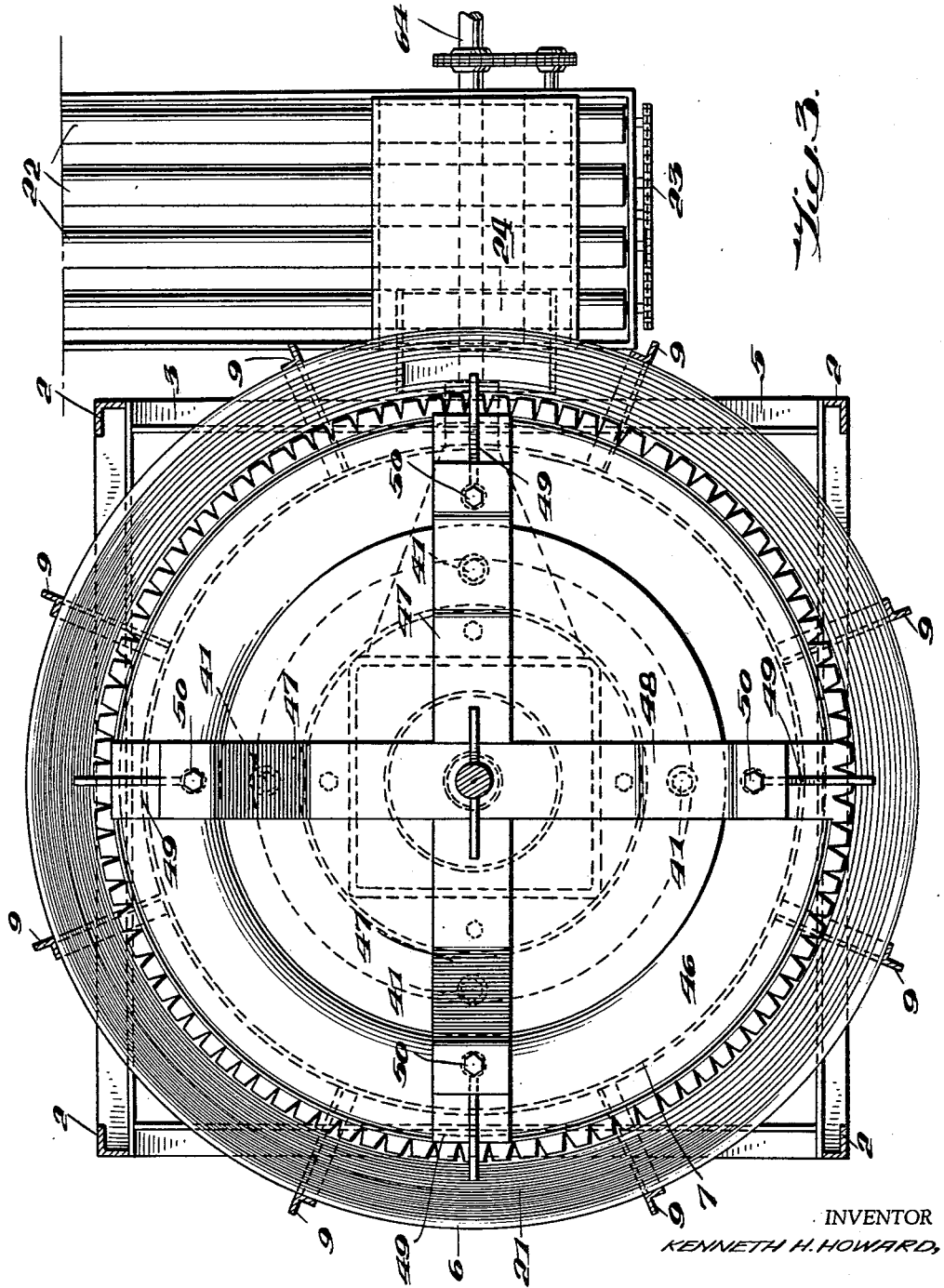

United States Patent Office 3,123,115
Patented Mar. 3, 1964

3,123,115
APPARATUS FOR HULLING NUTS
Kenneth H. Howard, Stockton, Mo., assignor to Hammons Products Company, Stockton, Mo.
Filed Sept. 24, 1959, Ser. No. 841,981
4 Claims. (Cl. 146—11)

This invention relates to an apparatus for breaking off pieces from rollable frangible objects by centrifugal forces developed in the rollable objects and screening these pieces from the remaining object.

This breaking and screening is accomplished by centrifugal forces built up in the objects by rapidly rolling the objects between one pliable surface which yields to each object, yet grips it and holds it against another surface which does not move as the pliable surface moves. That is, the object is rolled rapidly between two surfaces, one of which has openings for screening out the small parts. The second surface may also be pliable but the requirement for a different speed is still necessary. This device is particularly useful for hulling nuts as the hulls are of weaker texture than the nut and where beating and cracking of the desired product is to be avoided.

This device is particularly applicable to the hulling of black walnuts. A number of mechanical methods have been used for removing the hulls from nuts. Some cause the nuts to be passed over metal cutting blades. These may be saw-toothed or a bar type. Some machines remove the hulls by a violent beating to loosen the hull. Others prick the hull from the nut. There are others which hammer or subject the nut to forceful and violent impact. Others tend to grind off the hull or exert similar disrupting forces on the hulls between a rough breast and a cylinder. The brushes or spring pricks rapidly clog up and the bristles break or mat down. Changing brushes is time-consuming and expensive. The cutter blades must be frequently changed or sharpened and do not readily adapt themselves to different sizes of the nuts nor do they get into the crevices of nuts such as the black walnut. The type which grinds tends to crack or break the nut.

When the outer covering of the black walnut (species juglaus nigre), which is commonly grown in the United States, is green, wet and tenacious, it is difficult to remove. Moreover, the nut itself is not as hard as it is after it has dried. When these recently harvested nuts are beaten or hammered they often crack and a mould develops around the nut meat. Moreover, if the nut is dried, the kernel of the nut meat is easily cracked or crystallized if beaten or battered. Being a nut particularly rich in a strong volatile flavoring oils the meat quickly oxidizes to become rancid. Thus, these nuts are severely damaged by such a beating, hammering or battering.

The object of this invention is to provide an apparatus for the complete removal and separation of those parts of an object which is comminuted which are not fastened to it as strongly as the interior is held together, without damage from beating, hammering or battering. The exterior of the object is simply whirled off by rolling the object under a slight pressure at a rapid rate of some 1500 r.p.m. about an axis within itself so that the looser outer part separates itself from the inner more tenacious part. For example, as the hull of a nut is separated from the nut these parts spin away because of the centrifugal forces generated by the spinning or twirling of the object. Though other devices may roll objects to a certain extent as they comminute them, the action is incidental to a beating-hammering or grinding action and not accomplished by a pliable surface designed to give a rapid rolling action to throw off part of the object.

Experiments have shown that the action used on the nuts of this invention and the avoidance of beating and pounding them against bars or blades results in a hulled nut which may be stored much longer before the nut meat moulds and turns rancid, other things being equal. Repeated observations of nuts which have been hulled by any beating process have established that any beating process tends to crystallize the kernal, make the microscopic oil cells break so the oil is free to run together to oxidize and become rancid. Moreover, if the nuts are battered and beaten when hulled, it is found that when the nuts are cracked for removing their meats the kernals or nut meats tend to break up in small undesirable pieces to a much greater extent than those which have had their hulls rolled off. It is evident that the product processed by the apparatus disclosed in this invention is much superior to that processed in any apparatus used heretofore.

Other objects of the invention reside in the certain novel features of the construction, arrangement and combination of parts as will be hereinafter more fully described, and particularly pointed out in the appended claims, reference being had to the accompanying drawings forming a part of this specification and in which:

FIGURE 1 is a perspective view partly in section of the hopper, the cleaning and sacking chute and associated structure;

FIGURE 2 is a vertical section of the hulling cage and roller;

FIGURE 3 is a horizontal sectional view of the hulling cage and roller taken on the line 3—3 of FIG. 2.

Comminuting and separating the outer parts from the objects as contemplated by my present invention which is particularly useful for hulling black walnuts involves the exploding of the comparatively weak hull or husk of the nut from the creviced shell.

The forces developed in this apparatus are to be distinguished from those of the centrifuge where the masses fly from a center of the machine or cylinder. In this a twirling is established and maintained by tangential forces on the periphery of the objects. In each object centrifugal forces are developed which are at times centripetal and times are centrifugal with reference to the machine. They are actually with reference to the whole epicyclic when in the same plane and twirling. That is the periphery tends to fly from each twirling object when two surfaces are revolving discs, by a compounding of two sets of centrifugal forces. More explicitly, as the object is rolled about a circle it is subjected to centrifugal forces due to the circular path which the object itself follows. However the forces are more specifically those built up in the object itself as it spins or twirls about an axis within itself as it goes in the circle. The outer parts of the object, say the hull of a black walnut, are subject not only to any centrifugal forces incident to the curvature of the path it follows, but also to the forces inherent to the twirling or the spinning of the walnut itself. They are a combination of forces. Now, as an outer point on the object would describe an epicycloid, the forces generated and which act on the particle or point in the periphery that is in the hull of the walnut, are not always away from the center of the circular path but are varied as the path of the epicycloid. Of course, if the object is rolled between two cylindrical surfaces such as roller 7 and cage 6 the twirling subjects a point in the periphery to forces parallel to the axis of rotation plus gyroscopic forces to disrupt the rolling object. It is thus submitted that they are epicyclic, and are referred to as such.

This spinning or rolling or revolving of the nut very rapidly about an axis within itself is accomplished by gripping it on one side by a pliable yielding rapidly moving surface and rolling the nut over another surface not moving as the yielding surface. Either or both surfaces could be of the pliable and yielding material. Both surfaces must be generally smooth but still rough, serrated or knobby enough to cause the nut to rotate rather than to slide on either surface. One surface must be perforated or like a grating to allow the parts to fly out from between the surfaces. The surfaces must also be so operated with respect to each other that a gripping pressure is exerted on the nut but they must not be so close that the nut itself is cracked or broken by crushing. Though pressure on the hull of the nut as it is being rolled has a loosening effect, that effect is only incidental to the development of the epicyclic forces within the nut and is not necessarily the primary hull removing force.

As the unhulled nuts are somewhat spherical they tumble as they rotate, particularly if the two activating surfaces are nearly vertical and cylindrical. As the nut tumbles it rotates on other axes within it to create decorticating epicyclic forcs in other directions to complete the hulling. None of the actions is of a beating, cracking or breaking nature which injure the shell or the nut meats. Moreover, as the nut meats are in the center of the nut weaker epicyclic forces are developed in them by the nut rotating about an axis within the nut, than on the hull of the nut because the centrifugal forces increase as the distance from the axis increases when the speed of rotation remains the same or more specifically in this invention the epicycloid approaches the shape of a circle.

In practice, the apparatus has been attached to a truck chassis to give mobility to the apparatus. This mobility has allowed it to be taken to where the nuts have been gathered and thus avoid the extra cost of transporting the hulls to and from one location. The base includes four upright supporting legs of angle iron 1 at the corners of a rectangular base 5 for supporting the incharging storage hopper 4. There are four more upright supporting legs 2 with cross braces 8 to form another smaller rectangular base 3 which is connected with rectangle 5. The smaller rectangular base 3 supports the cage 6. The supporting means for the roller 7 within the cage 6 is adjustably connected at 11 and 12 with the cross members of the rectangular base 3. To rectangle 3 are welded eight spacing bars 9 set upright at equal distance as stakes from each other and all equal distance from a central point to form the guide posts for constructing the circular cage 6.

The cage is formed of some thirteen concentric circular rings 13 of one-half inch serrated concrete reinforcing rod. The ring at the top of the cage is some three inches larger in diameter than the third from the bottom 14. Three substantially increasingly smaller rings 14, 15 and 16 are at the bottom to fit close to the lower side of the roller 7. The rings are each welded to each of the eight spacing angle irons 9 to form a hollow inverted truncated cone which is called the cage. However, an orifice 20 is created in one side of the cage by cutting a section some five inches long out of rings 11, 12 and 14. A spacing of ⅝ inch between each ring allows the small hull fragments to fly out between the rings but retains the black walnuts inside until they roll to the orifice 20.

The storage hopper 4 has three inclined sides 30 and a fourth vertical side 31 which descend to a well 32. In the bottom of the well is a turn table 40 with a half inch bolt 33 welded across the center to form a ridge to act as an agitator for the nuts. In the lower part of the vertical side there is a gate 34 which may be raised and lowered by the lever 35 in the guides 36 and 36. The gate permits the walnuts to run out of the well onto the rotating table 40. This rotating table is bolted to four lugs 41 which are welded to the rim for an ordinary inflatable automobile tire 46. The outside or tread of the tire constitutes the roller 7 within the cage 6.

On turn table 40 there are two cross arms 47 and 48 at right angles to each other. At each of the four ends of the two cross arms there is a blade 49 hinged at 50. The hinges are braced at the top by an inclined tie 51 to the cross arm to overcome the centrifugal forces generated by the rotation of the cross arms 47 and 48 with the roller. The cross arm is in turn bolted to the table and lugs 41.

The tire rim and wheel 60 are bolted to a flange 61 which in turn is fastened to a shaft 62. The shaft 62 is supported by bearings in the gear box 63. It is driven from exterior motor through the drive shaft 64. The tire or roller may be inflated to be yieldable to black walnuts but still give a firm surface. The tread of the tire should be more of a knobby type than of the type having only channels running around the wheel. The space between the tire and the cage is about ¾ inch at the orifice 20 and nearly three inches on the opposite side 1 where the nuts drop into the rolling ring. This space is adjustable by shifting the cage in a horizontal direction after loosening three bolts at 11 and 12. The spacing at the opposite side where the un-hulled nuts drop down does not need to be adjusted so accurately so long as it is greater than two inches but generally less than four inches, depending on the size of the unhulled walnuts. Enclosing the orifice 20 is a box 24 which is open at the bottom and toward the orifice 20. Underneath it are four two-inch rollers 22 set parallel with a space of about one-half inch between them. These rollers 22 are driven by a chain 23 and sprockets 26. The rollers are sloped to a sacker 25 so the nuts roll toward the sacker as the rolls are turned.

After the unhulled walnuts are charged into the hopper 4 the door 34 is raised by lowering the handle of the lever 35. The walnuts in the well are agitated by the blot formed ridge 33 welded onto the table 40. As the turn table 40 is revolved by the driving mechanism through the gear box 63 the table becomes a merry-go-round with the walnut riders coming onto it from the central well 32 through the door 34. The walnuts as they start around with the turn table 40 roll toward the surrounding cage 6. The walnuts are then pushed along the interior wall of the cage by the four blades 49 which rotate with the table as the galloping animals of a merry-go-round. But, of course, the round walnuts work toward the cage because of the centrifugal forces generated by the turning table just as one riding a merry-go-round is thrown to the outside. But here the surrounding cage prevents the walnuts from being thrown off the merry-go-round. Generally there is only a space of two or three inches from the merry-go-round and the roller 7 below it except at the side of the cage 21 opposite the orifice 20. When the walnuts have rolled to the cage 6 they might stop except that the blades 49 which are hinged at 50, push them along. The blades catch the nuts and bend back and start the walnuts twirling as they start to roll along the serrated rings of the cage 6. As they roll along the cage wall they increase their twirling speed as they are stroked on the inside away from the cage to encourage this twirling or rolling. Soon each one twirls rapidly and attains a very high number of revolutions per minte. The walnuts fall down at 21 and are grabbed firmly between the tire and the cage at 21 opposite the side from the orifice where the space between the wheel and the cage is largest. The table itself rotates at speeds from 250 to 350 r.p.m. The diameter of the nuts which is about three inches compared to some thirty inches for the cage tends to make the twirling of the nuts approach 1,500 r.p.m. The nut drops from one ring to the next as it goes around the cage or directly out of the orifice 20. If the cage is formed by bending the serrated concrete rod in the shape of a helix in place of a series of rings the nut can follow the helix to the orifice 20. This very rapid twirling of the nuts develops great forces which throw the hull from the nut. The cage also acts as a sieve or colander to separate the hulls from the nuts. With the centrifugal force of both the revolving of the wheel and the twirling of the nuts the hulls fly out between the serrated half inch rods through the five-eighths inch spaces between them. The hulled nuts roll around to the orifice 20 and fly into the box 24. They then drop onto the rollers 22. As the rollers turn, the loosened pieces of hull which may have come out with the nut fall between the rollers. As the rollers turn the nuts are further cleaned by the turning of the rollers as they descend to the sacker at the lower end of the rollers.

It is my intention to cover all changes and modifications of the embodiment of the invention herein chosen for purposes of disclosure which do not constitute departures from the spirit and scope of the invention.

What I claim is:

1. Apparatus for removing hulls from nuts comprising a generally cylindrical container formed with a side wall, said cylindrical container having a substantially vertical axis, said container being tapered inwardly toward the bottom of said side wall, and having an opening formed in said side wall, a member of yieldable material mounted within said container forming a circular wall substantially concentric with said tapered cylindrical container providing therewith a tapered annular space so that by rotating said member having the yieldable wall, unhulled nuts in said tapered annular space are subjected to tangential forces by the yieldable material squeezing and rotating the unhulled nuts against said side wall of said container, the side wall of said container formed at least in part adjacent said opening of a plurality of concentric rodlike members spaced vertically an amount less than the diameter of the unhulled nuts so that as the unhulled nuts are moved between said substantially concentric walls, a rotary motion about the axis of the nut is generated which throws portions of the hull of the nut between said rodlike members by centrifugal force as the hull is squeezed and crushed between said side wall and said circular wall.

2. The apparatus as claimed in claim 1, in which the member of yieldable material forming a circular wall comprises a pneumatic tire.

3. The apparatus as claimed in claim 1, in which mounting means are provided to effect relative motion of the axes of said side wall and said circular wall to control the radial spacing of the tapered annular space therebetween.

4. The apparatus as claimed in claim 1, in which the radial spacing of the walls forming the tapered annular space is greater at the top of said space than the average unhulled nut and the space at the bottom is less than the hulled nut.

References Cited in the file of this patent

UNITED STATES PATENTS

| | | |
|---|---|---|
| 169,289 | Pease | Oct. 26, 1875 |
| 665,935 | Rudolph | Jan. 15, 1901 |
| 753,152 | Loescher | Feb. 23, 1904 |
| 1,496,312 | Harkin | June 3, 1924 |
| 1,729,905 | Voigt | Oct. 1, 1929 |
| 1,994,906 | Burgin | Mar. 19, 1935 |
| 2,031,810 | Anderson | Feb. 25, 1936 |
| 2,161,032 | Formway | June 6, 1939 |
| 2,181,218 | Thompson | Nov. 28, 1939 |
| 2,562,560 | Macartney | July 31, 1951 |
| 2,771,078 | Summers | Nov. 20, 1956 |
| 2,799,312 | Ervin | July 16, 1957 |
| 2,848,027 | Packwood | Aug. 19, 1958 |
| 2,910,070 | Greedy et al. | Oct. 27, 1959 |

FOREIGN PATENTS

| | | |
|---|---|---|
| 329,442 | Germany | Nov. 25, 1920 |